UNITED STATES PATENT OFFICE.

EMIL KNOEVENAGEL, OF HEIDELBERG, GERMANY.

DYEING ACETYL CELLULOSE.

961,241.  Specification of Letters Patent.  Patented June 14, 1910.

No Drawing.  Application filed November 23, 1907.  Serial No. 403,573.  (Specimens.)

*To all whom it may concern:*

Be it known that I, EMIL KNOEVENAGEL, professor of chemistry, a subject of the German Emperor, residing at Heidelberg, in the Grand Duchy of Baden, Germany, have invented certain new and useful Improvements Relating to the Art of Dyeing Acetyl Cellulose, of which the following is a specification.

Acetyl-cellulose and filaments or other products made from the same are not moistened by water and are therefore not dyed at all or only feebly by aqueous solutions of dyestuffs according to ordinary processes of dyeing.

I have discovered, that acetyl-cellulose assumes intense colors in aqueous dyestuff solutions, if the surface of the fabric of acetyl-cellulose has been previously modified, by treatment with organic substances or their aqueous solutions, which are capable of swelling up or inflating acetyl-cellulose, such as alcohol, acetic acid and acetone.

The process consists in treating the filament or other product of acetyl-cellulose, at ordinary or at elevated temperature with such substances for a period depending on the nature of the organic substance selected, and on whether the said substance is used *per se* or in aqueous solution, preferably by introducing the said fabric into the said substance or its aqueous solution and allowing it to remain therein for the required time, then wringing the fabric, rinsing it with water, if required, and finally dyeing the fabric in an aqueous dyestuff solution by one of the ordinary dyeing processes. For instance, filaments of acetyl-cellulose may be allowed to remain in 50 per cent. aqueous alcohol or in dilute glacial acetic acid or in a mixture of alcohol and acetone in equal volumes for 12 hours at the temperature of an ordinary living room. Concentrated alcohols and the like will also enhance the dyeing capacity of acetyl-cellulose, although not as efficiently as mixtures of the same with water. Even substances which are insoluble in water, such as anilin and ether, enhance to some extent the capacity of cellulose acetate for the absorption of dyestuffs in the process of dyeing in aqueous solutions, provided that the acetyl-cellulose is allowed to remain in such liquids or their solutions for a considerable time. Even solutions of soap, especially when used warm, act in the same direction, but more feebly than for instance, dilute alcohols.

The dyestuffs, such for example, as methylene blue, malachite green, fuchsin, safranin and others and even those dyestuffs which are not soluble or only sparingly soluble in water, such as the anthracene dyestuffs, also vat dye stuffs are rapidly taken up from aqueous dye-baths by the acetyl cellulose prepared as described and yield substantially more intense colorations than acetyl-cellulose which has not been thus prepared.

It has already been proposed (see German Patent No. 193135 of the Aktiengesellschaft für Anilinfabrikation at Berlin) for the dyeing of acetyl-cellulose, to add organic substances, such as alcohol, acetic acid, and acetone directly to the aqueous solutions of the dye-stuffs. The addition of such substances to aqueous dye-stuff solutions may, however, be dispensed with, if according to the above process the acetyl-cellulose, before dyeing it in aqueous solution is subjected to preliminary treatment with suitable organic substances or mixtures of the same with water. This process affords the advantage, that the actual dyeing process may be performed in aqueous solution in the manner well-known for basic or acid dyestuffs or for vat-dyestuffs, so that for dyeing the most various dyestuffs one special bath only, for instance a bath of aqueous alcohol, is required. In this bath the acetyl-cellulose is allowed to remain for the required time and then carefully relieved of the aqueous alcohol adhering to the same, by wringing, so that this process results in a substantial saving of alcohol, in comparison with the use of dyestuff baths mixed with alcohol.

Even if according to the present process, the alcohol and the like be almost completely removed from the acetyl cellulose by protracted rinsing thereof after wringing it out with water, the property of the acetyl-cellulose to be quickly and completely dyed by aqueous solutions of dye-stuffs is retained. If small quantities of alcohol for example, such as still adhere in this process after the acetyl cellulose has been rinsed, be added to aqueous solutions of dye-stuffs and if attempts be made to dye therein acetyl-cellulose which has not been previously treated, the dyestuff is either not taken up at all or only very badly.

What I claim is:—

1. The improvement in the art of dyeing acetyl-cellulose, which consists in treating the acetyl-cellulose with aqueous solutions of the herein described organic substances which are capable of swelling acetyl-cellulose, then wringing the product, rinsing it with water and then dyeing it in aqueous dyestuff solution, substantially as described.

2. The improvement in the art of dyeing acetyl-cellulose, which consists in treating the acetyl-cellulose with diluted alcohol, then wringing the product, rinsing it with water and dyeing it in aqueous dyestuff-solution, substantially as described.

In testimony whereof I have set my hand in the presence of two subscribing witnesses.

EMIL KNOEVENAGEL.

Witnesses:
 HANS LEBACH,
 JOS. H. LEUTE.